United States Patent [19]

Yanko et al.

[11] Patent Number: 5,246,399
[45] Date of Patent: Sep. 21, 1993

[54] TWO-STAGE TORSIONAL VIBRATION DAMPER

[75] Inventors: John P. Yanko, Shelby Township, Macomb County; Malcolm E. Kirkwood, Livonia; Kenneth C. Yuergens, Farmington Hills, all of Mich.

[73] Assignee: Borg-Warner Automotive Transmission & Engine Components Corporation, Sterling Heights, Mich.

[21] Appl. No.: 805,228

[22] Filed: Dec. 11, 1991

[51] Int. Cl.$^5$ .............................. F16D 3/12; F16D 3/66
[52] U.S. Cl. ................................. 464/63; 192/106.2; 464/68
[58] Field of Search ..................... 464/62, 63, 66–68; 192/106.1, 106.2

[56] References Cited

U.S. PATENT DOCUMENTS

| | | | |
|---|---|---|---|
| 4,347,717 | 9/1982 | Lamarche | 464/64 |
| 4,441,595 | 4/1984 | Lamarche | 192/3.29 |
| 4,461,376 | 7/1985 | Lech, Jr. et al. | 192/106.2 |
| 4,533,338 | 8/1985 | Hamada | 464/68 X |
| 4,560,054 | 12/1985 | Kayanoki et al. | 464/68 X |
| 4,606,450 | 8/1986 | Ball et al. | 464/68 X |
| 4,613,029 | 9/1986 | Beccaris | 464/68 X |
| 4,637,500 | 1/1987 | Göbel et al. | 464/63 X |
| 4,668,207 | 5/1987 | Koshimo | 464/68 X |
| 4,702,721 | 10/1987 | Lamarche | 464/67 |
| 4,760,754 | 8/1988 | Friedmann | 464/68 X |
| 4,941,860 | 7/1990 | Graton | 464/68 |

Primary Examiner—Daniel P. Stodola
Assistant Examiner—William G. Battista, Jr.
Attorney, Agent, or Firm—Reising, Ethington, Barnard, et al.

[57] ABSTRACT

The two-stage torsional vibration damper includes an outer hub driven by a torque input drive member, a ring member, rotatably supported in the outer hub, an inner hub rotatably supported in the ring member, and a torque output member at the center of the inner hub. A front spring retainer plate is attached to one side of the ring member and a rear spring retainer plate is attached to the other side of the ring member. The spring retainer plate retains outer spring assemblies in spring assembly apertures in the outer hub and retain inner spring assemblies in spring assembly apertures in the inner hub. Torque is transmitted from the outer hub to the outer spring assemblies to the spring retainer plates to the inner spring assemblies to the inner hub. The outer spring assemblies can be compressed until rotation of the inner hub relative to the ring member is stopped. Increases in torque after rotation between the outer hub, the ring member and the inner hub is stopped, is transferred from the outer hub, to the ring member and to the inner hub. The ring member can be an integral part of the front and rear spring retainer plates rather than a separate piece, if desired.

20 Claims, 8 Drawing Sheets

TWO-STAGE TORSIONAL VIBRATION DAMPER

FIELD OF THE INVENTION

The two-stage torsional vibration damper is utilized in clutches for automotive vehicles. Torsional vibration dampers can be used in a vehicle drive train in combination with a manual transmission or in a vehicle drive train in combination with a torque converter as a portion of a torque converter lock-up clutch.

BACKGROUND OF THE INVENTION

Reciprocating internal combustion engines produce an output torque with torsional vibrations. These torsional vibrations cause undesirable impact loads, vibration and noise in vehicles and vehicle drive trains. Vehicles with manual transmissions employ torsional vibration dampers in the clutches which transmit torque from the engine crankshaft to the transmission input shaft. Vehicles with torque converters have relied upon the torque converter to provide hydraulic torsional vibration dampening. However, torque converters frequently include lock-up clutches to reduce power loss during certain operating conditions such as high engine speed operation. When the lock-up clutch is engaged there is minimal hydraulic torsional vibration dampening by the torque converter. Lock-up clutches used in combination with torque converters, therefore, include torsional vibration dampers.

Torsional vibration dampers employing compression springs, to absorb torsional vibrations, frequently have several spring assemblies that are positioned in a circle and are loaded together, parallel to each other. Each of the spring assemblies are loaded in compression between two surfaces that move toward and away from each other in an arc about a fixed point. To prevent failures of coil springs due to buckling, it is desirable to limit the change in the angular position of the surfaces, in contact with the ends of each spring assembly, relative to each other. The angular positions of the surfaces in contact with the ends of each spring assembly can be limited by limiting the angular travel between the clutch input and output members.

A torsional vibration damper with a plurality of compression springs loaded together in parallel provides limited angular travel of the torque input member relative to the torque output member. To obtain the torsional vibration dampening desired in some vehicle drive trains, the angular movement of the torque output member relative to the torque output member must be increased.

The angular movement between the torque input and the torque output members of a torsional vibration damper can be increased by placing several springs together in series, as shown in U.S. Pat. No. 4,702,721 to Lamarche. This arrangement requires separators, sometimes referred to as skates, between the springs that are loaded in series. Skates add weight, cost and complexity to a torsional vibration damper. The separators are supported and guided in arcuate clots. The ends of the slots provide a single stop for each group of springs in series. The single stop limits compression of only one spring in each group of three springs in series.

The angular movement between the torque input and the torque output members of a torsional vibration damper can also be increased by placing first stage springs in series with second stage springs that are closer to the axis of rotation of damper than the first stage springs. The first stage springs are located along an outer circle and are compressed in parallel to each other. The second stage springs are located along an inner circle and are compressed in parallel to each other. The first stage is in series with the second stage. A torsional vibration damper with first stage compression springs loaded in series with second stage compression springs is shown in U.S. Pat. No. 4,347,717 to Lamarche. Stops are not provided in the two stage torsional vibration damper disclosed inn the '717 patent.

Coil compression springs can be damaged by being subjected to shock loads when they are compressed beyond design limits. These shock loads can lead to broken springs. Stops which prevent springs from becoming compressed beyond design limits can prevent damaged and broken springs.

Torsional vibration dampers with compression springs in stages and the stages in series with each other have a critical need for stops to protect the springs. One of the stages will almost always reach the end of its travel before the other stage reaches the end of its travel. Two or more stages of compression springs that are loaded in series take substantial space, leaving little space for stops. The two stages of compression springs in the '717 damper take most of the available space.

Rivets or pins which can be used for stops, as shown in the '721 patent, can concentrate the forces in a torsional vibration damper. The concentration of forces in a limited number of areas in a damper requires that those areas be strengthened. Strengthening of such areas increases the weight and cost of a torsional vibration damper.

SUMMARY OF THE INVENTION

The object of the invention is to provide a torsional vibration damper, for a clutch that has two concentric stages of compression spring in series with each other, with stops to protect the springs in both stages.

Another object of the invention is to provide a torsional vibration damper which limits the maximum force exerted on several components to limit the strength and weight of those components.

A further object of the invention is to provide a torsional vibration damper with a limited number of parts.

A still further object of the invention is to provide a compact torsional vibration damper.

The torsional vibration damper includes an outer hub with torque input drive members spring assembly apertures and torque transmission tangs, with stop engaging surfaces, that extend radially inward. A ring member with radially outer grooves is positioned adjacent to the outer hub with the torque transmission tangs of the outer hub in the radially outer grooves. End walls at the ends of the radially outer grooves contact the stop engaging surfaces on the outer hub torque transmission tangs to limit rotation of the outer hub relative to the ring member. The ring member also has radially inner recesses with recess end surfaces. An inner hub has torque transmission tangs that project into the radially inner recesses in the ring member. Stop engaging surfaces on the inner hub torque transmission tangs contact the recess end surfaces of the radially inner recesses in the ring member to limit rotation of the ring member relative to the inner hub. Spring assembly apertures are provided in the inner hub.

Compression spring assemblies are mounted in the spring assembly apertures in the outer hub and in the spring assembly apertures in the inner hub. A front spring retainer plate and a rear spring retainer plate are secured to the ring member. The outer hub, the ring member and the inner hub are positioned between and are axially positioned relative to each other by the front and rear spring retainer plates. Spring retainer pockets in the front and rear spring retainer plates retain the compression spring assemblies in the spring assembly apertures in the outer and inner hubs. Spring drive surfaces at the ends of the spring retainer pockets contact the compression spring assemblies to transmit torque to and from the compression spring assemblies. A torque output member is provided at the center of the inner hub.

Input torque drives the outer hub. The outer hub transfers torque to the compression spring assemblies in the outer hub spring assembly apertures which drive the front and rear spring retainer plates. The front and rear spring retainer plates transfer torque to the compression spring assemblies in the spring assembly apertures in the inner hub. The compression spring assemblies in the inner hub spring assembly apertures transmit torque to the inner hub to drive a torque output shaft.

The compression spring assemblies in spring assembly apertures in the outer hub are compressed as torque increases and the outer hub rotates relative to the ring member until the stop engaging surfaces on the torque transmission tangs contact the end walls of the radially outer grooves in the ring member. The compression spring assemblies in the spring assembly apertures in the inner hub are compressed as torque increases and the ring member rotates relative to the inner hub until the recess end surfaces of the radially inner recesses in the ring member contact the stop engaging surfaces on the inner hub torque transmission tangs. When the torque load on the torsional vibration damper has compressed the spring assemblies to the point that further rotation of the outer hub relative to the inner hub is prevented by the ring member, further increases in torque will pass from the outer hub to the ring member to the inner hub. The torque on the front and rear spring retainer plates and on the compression spring assemblies remains constant while the outer hub, the ring member and the inner hub are blocked from rotation relative to each other.

In one embodiment, the front spring retainer plate and the rear spring retainer plate are steel plates that have been formed in a press and the ring member is a separate piece. The two spring retainer plates are riveted to the ring member to form a single rigid part. In a second embodiment, the front spring retainer plate and the rear spring retainer plate are cast parts. The cast front and rear spring retainer plates are cast with an integral ring member. When the cast front and rear spring retainer plates are riveted together, they include surfaces which rotatably support an inner hub and an outer hub. The two cast members also include end wall surfaces and recess ends that cooperate with stop surfaces on the inner hub and stop surfaces on the outer hub to limit rotation of the inner hub and the outer hub relative to the cast front spring retainer plate and the cast rear spring retainer plate.

Other objects and advantages of the invention will become more apparent from the following description when it is considered in conjunction with the accompanying drawing.

DESCRIPTION OF THE PREFERRED EMBODIMENT

The torsional vibration damper 10 is shown in the drawing as a lock-up clutch for a torque converter. Parts of the torque converter are included in the drawing to illustrate how the damper works as a lock-up clutch. The torsional vibration damper can also be used as part of a conventional clutch which transfers torque from an internal combustion engine to driven components of a drive train.

Figure 2:
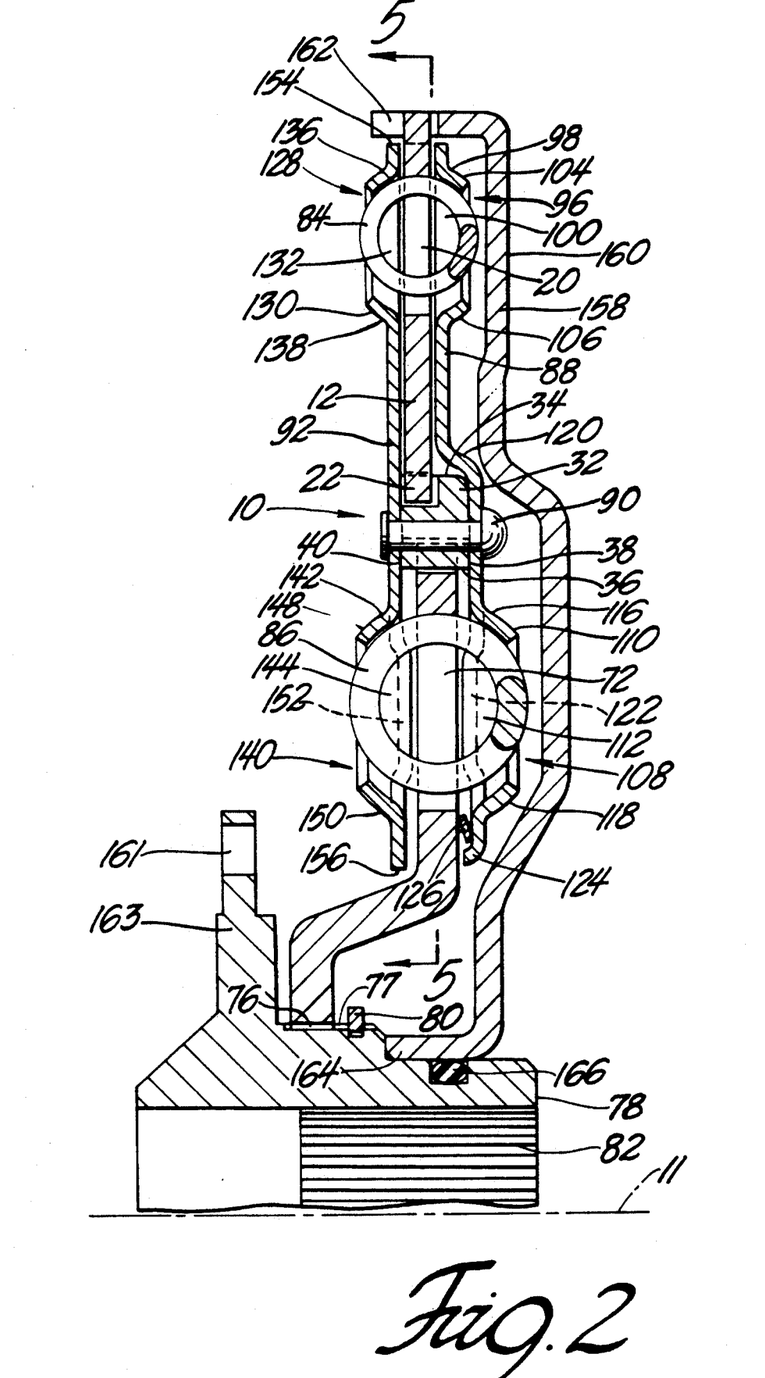
FIG. 2 is an enlarged cross sectional view of the torsional vibration damper taken along the irregular line 2—2 of FIG. 1, in a torque converter.

The torsional vibration damper rotates about an axis of rotation 11, shown in FIG. 2. In the following description the term "inner" will mean toward the axis of rotation 11. The term "outer" will mean away from the axis of rotation 11. The term "axial" refers to directions parallel to the axis 11. The term "front" means toward the power source in common vehicle arrangements. The term "rear" means toward the transmission in common vehicle arrangements.

Figure 5:
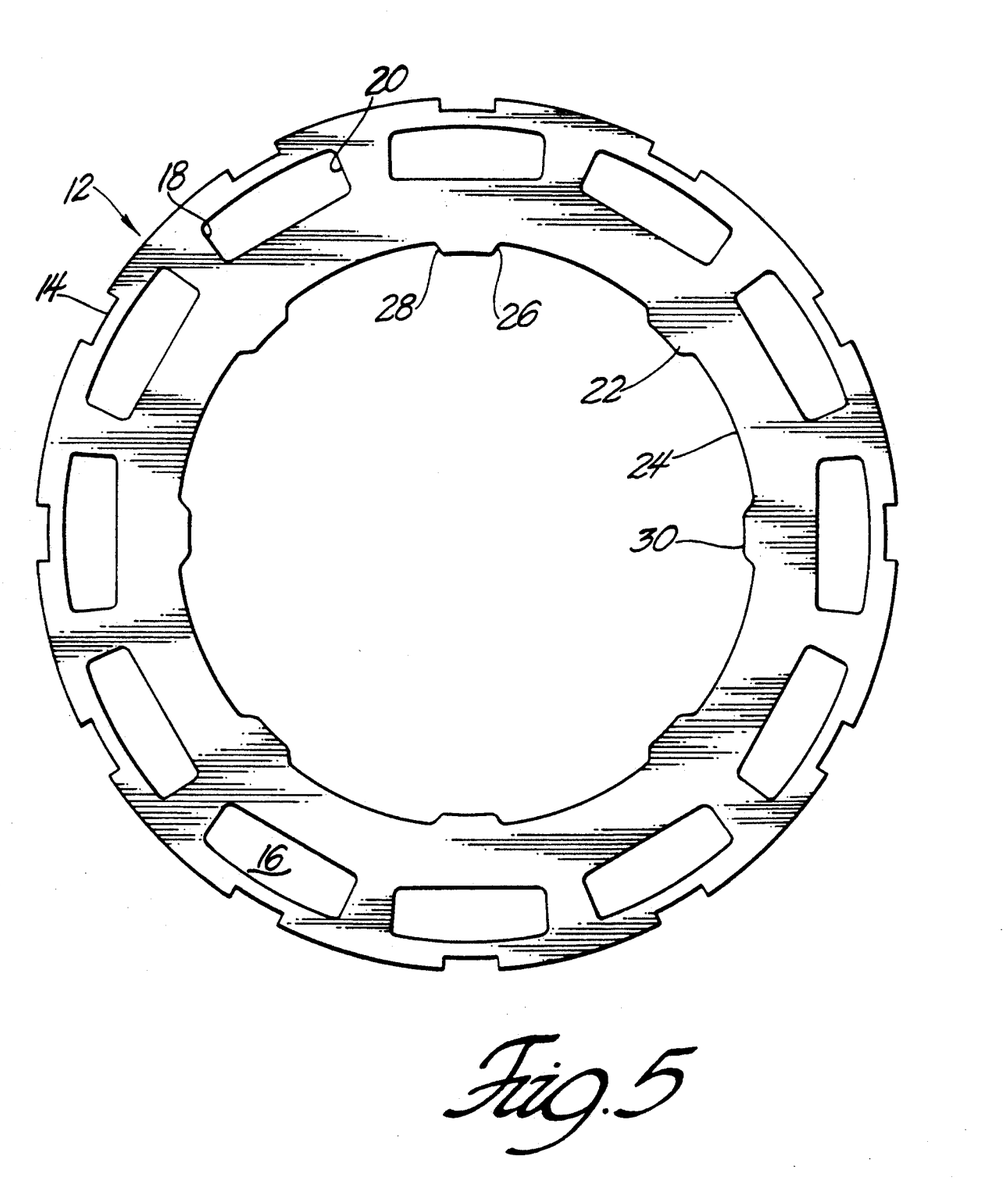
FIG. 5 is a reduced front elevational view of the outer hub.
Figure 6:
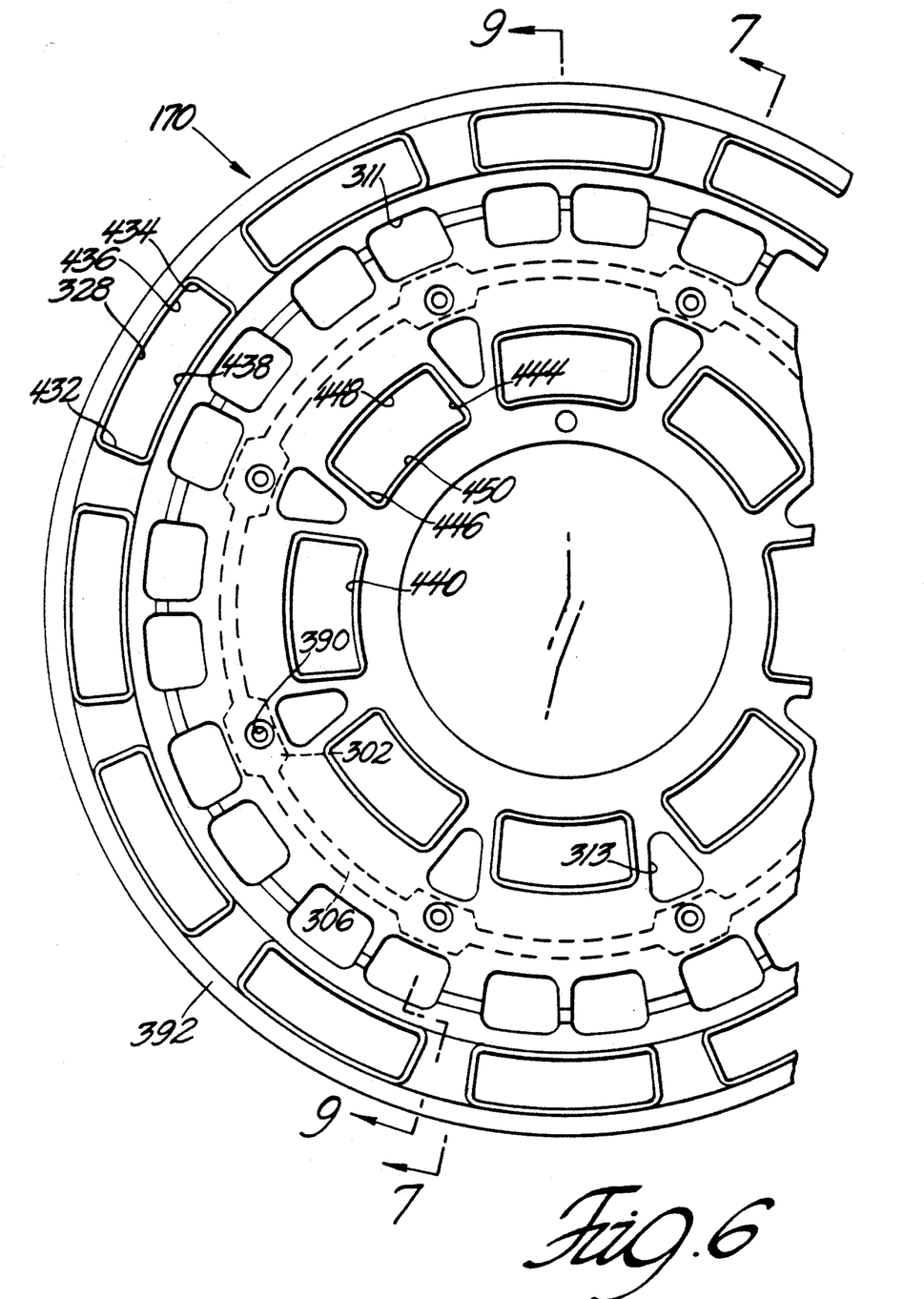
FIG. 6 is a partial rear elevational view of an alternate form of the invention with integral spring retainer plates and ring member.

The torsional vibration damper 10 has an outer hub 12. The outer hub 12 is a flat ring with slots 14 in its outer periphery which are engageable with a torque input member. There are twelve slots 14 in the outer hub 12 as shown in FIG. 5. Twelve spring assembly apertures 16 are provided in the outer hub 12. The spring assembly apertures 16 are spaced along a circle which is concentric with the axis of rotation 11 of the torsional vibration damper 10. The spring assembly apertures 16 have long axes, that are generally tangential to arcs about the axis of rotation. Each spring assembly aperture 16 also has spring driving ends 18 and 20. Eight torque transmission tangs 22 project radially toward the center of the outer hub 12 from the radially inner surface 24 of the outer hub. Each of the torque transmission tangs 22 has stop engaging surfaces 26 and 28 that extend from the radially inner surface 24 to the radially inner tip 30 of the torque transmission tangs 22.

Figure 3:
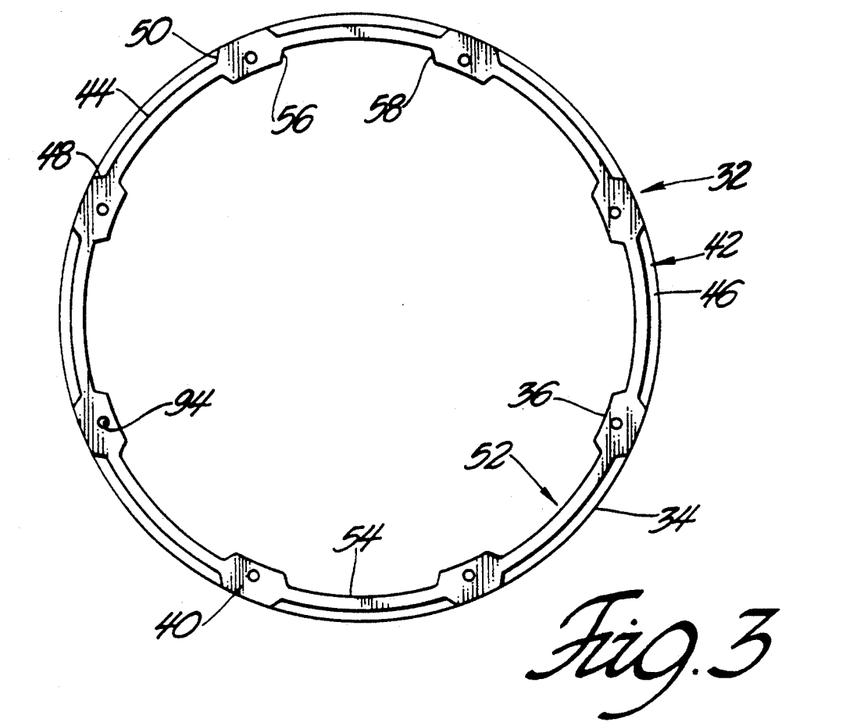
FIG. 3 is a reduced rear elevational view of the ring member.

A ring member 32, shown in FIG. 3, has a circular outer surface 34 that is concentric with the axis of rotation of the torsional vibration damper 10. The inner surface segments 36 of the ring member 32 lie on a circle which is also concentric with the axis of rotation 11 of the torsional vibration damper 10. The ring member 32 also has a flat front surface 38 and a flat rear surface 40. The flat front surface 38 and the flat rear surface 40 could be some shape other than flat, if desired. Eight arcuate grooves 42 are provided in the circular outer surface 34 of the ring member 32. The arcuate grooves 42 extend from circular outer surface 34 radially inward to surface segments 44 that are in a circle that is concentric with the axis of rotation 11 of the torsional vibration damper 10. The arcuate grooves 42 also extend axially from the flat rear surface 40 to surfaces 46 that are in a plane that is between the flat front surface 38 and the flat rear surface 40. The arcuate grooves 42 end at end walls 48 and 50. Eight recesses 52 are provided in the radially inner surface of the ring member 32. These recesses 52 are defined by the arcuate surfaces 54 which are concentric with the axis of rotation 11 of the torsional vibration damper 10. The recesses extend from the flat front surface 38 to the flat rear surface 40 of the ring member 32 and from one recess end surface 56 to another recess end surface 58. The recess end surfaces 56 and 58 extend generally radially outward from the inner surface segments 36 to the surface segments 44.

Figure 4:
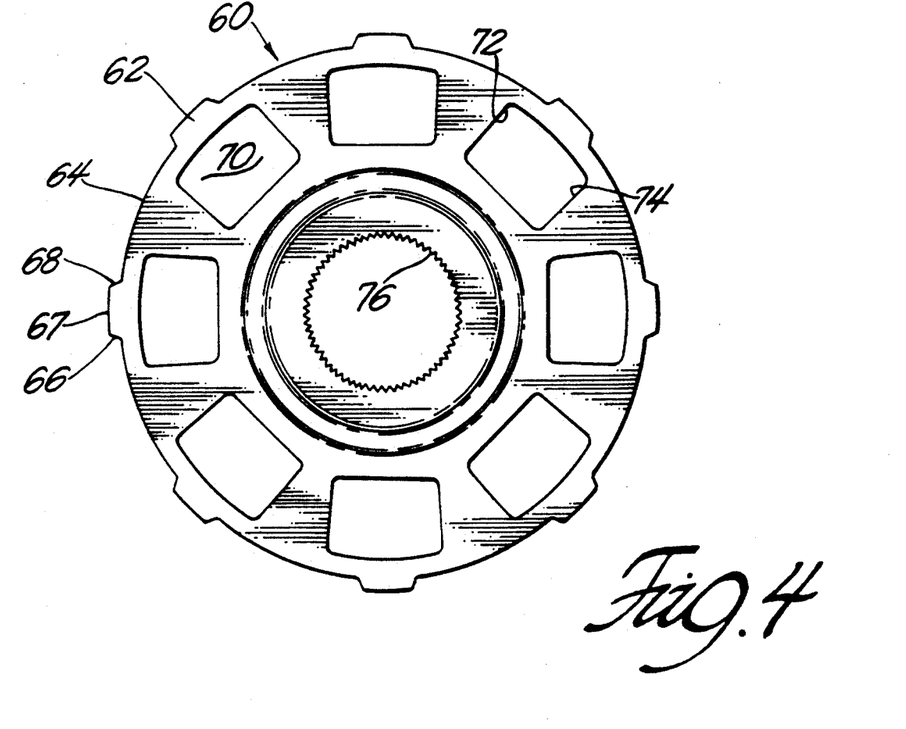
FIG. 4 is a reduced rear elevational view of the inner hub.

An inner hub 60, shown in FIG. 4, has eight torque transmission tangs 62 that extend radially outward from the arcuate edge surfaces 64. The sides of the torque transmission tangs 62 are stop engaging surfaces 66 and 68. Eight spring assembly apertures 70 are in the inner hub 60. Each of the spring assembly apertures 70 has spring driving ends 72 and 74. A central aperture in the inner hub 60 has splines 76. The splines 76 engage splines 77 on a hub barrel 78. A lock-ring 80 holds the inner hub 60 on the hub barrel 78. Splines 82 in the hub barrel engage splines on a transmission input shaft and transmit torque to the transmission.

The splines 76 allow axial adjustment of the inner hub 60 relative to the hub barrel 78. In some torque converters such an axial adjustment may be required. If axial adjustment of the inner hub 60 relative to the hub barrel 78 is not required, the inner hub 60 can be attached securely to the hub barrel 78 by rivets or by welding. It is also possible to manufacture the inner hub 60 and the hub barrel 78 as one piece.

The ring member 32 slides over the inner hub 60 with the inner surface segments 36 adjacent to the arcuate edge surfaces 64. The torque transmission tangs 62 of the inner hub 60 are positioned in the recesses 52 in the ring member 32. Pivotal movement of the ring member 32 in one direction relative to the inner hub 60 is limited by contact between the end surfaces 56 of the recesses 52 and the stop engaging surfaces 66 of the torque transmission tangs 62. Pivotal movement of the ring member 32 in the other direction relative to the inner hub 60 is limited by contact between the end surfaces 58 of the recesses 52 and the stop engaging surfaces 68 of the torque transmission tangs 62.

The outer hub 12 slides over the ring member 32 with radially inner surface 24 of the outer hub 12 adjacent to circular outer surface 34 of the ring member. The torque transmission tangs 22 of the outer hub 12 are positioned in the arcuate grooves 42 in the ring member 32. Pivotal movement of the outer hub 12 relative to the ring member 32 in one direction is limited by contact between the stop engaging surfaces 28 on the torque transmission tangs 22 and the end walls 50 of the arcuate grooves 42. Pivotal movement of the outer hub 12 relative to the ring member 32 in the other direction is limited by contact between the stop engaging surfaces 26 on the torque transmission tangs 22 and the end walls 48 of the arcuate grooves 42.

Figure 1:
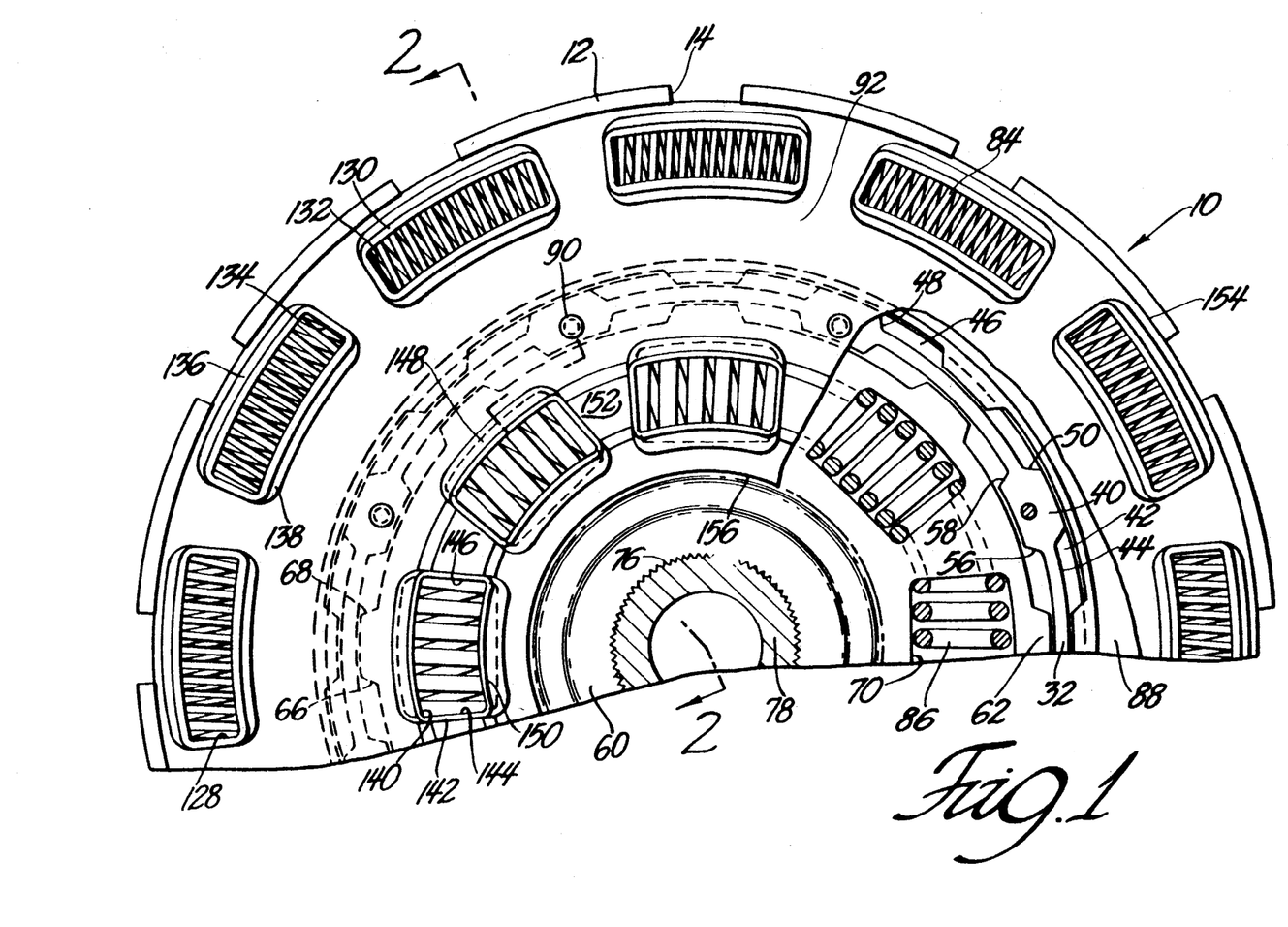
FIG. 1 is a partial rear elevational view of a torsional vibration damper with some parts broken away and other parts shown in section to show internal parts of the damper.

Outer spring assemblies 84 are positioned in each of the twelve spring assembly apertures 16 in the outer hub 12. Inner spring assemblies 86 are positioned in each of the eight spring assembly apertures 70 in the inner hub 60. The spring assemblies 84 and 86 are coil compression springs. The usual arrangement is for the spring assemblies 84 and 86 to each include two coil springs with one of the springs, having a smaller diameter, positioned inside the other spring, having a larger diameter. Single springs have been shown in the drawing for convenience and to reduce confusion regarding the drawing.

A front spring retainer plate 88 is secured to the flat front surface 38 of the ring member 32 by rivets 90. The rivets 90 also secure a rear spring retainer plate 92 to the flat rear surface 40 of the ring member 32. Eight holes 94 are provided in the ring member 32 for the rivets 90, as shown in FIG. 3. The spring retainer plates 88 and 92, maintain proper axial alignment between the outer hub 12, the ring member 32, and the inner hub 60. Axial alignment is maintained to keep the torque transmission tangs 22 of the outer hub 12 in the arcuate grooves 42 and to keep the torque transmission tangs 62 of the inner hub 60 in the recesses 52 in the ring member 32.

The front spring retainer plate 88 has twelve radially outer spring apertures 96. The spring apertures 96 are surrounded by a forwardly projecting flange 98. The spring apertures 96 and the flanges 98 form spring retainer pockets. The portions of the forwardly projecting flange 98 at the ends of the radially outer spring apertures 96 provide spring drive surfaces 100 and 102. The portions of the forwardly projecting flange 98 at the sides of the spring apertures 96 provide curved spring retainer lips 104 and 106. The front spring retainer plate 88 also has eight radially inner spring apertures 108. The inner spring apertures 108 are surrounded by a forwardly projecting flange 110. The spring apertures 108 and the flanges 110 form spring retainer pockets. The portions of the forwardly projecting flange 110 at the ends of the radially inner spring apertures 10B provide spring drive surfaces 112 and 114. The portions of the forwardly projecting flange 110 at the sides of the inner spring apertures 108 provide curved spring retainer lips 116 and 118. The front spring retainer plate 88 includes a circular axial offset 120 which forms a nest for the ring member 32 and compensates for the outer hub 12 having a smaller axial thickness than the ring member. Portions 122 of the front spring retainer plate 88 between the radially inner spring apertures 108 are offset to the rear to axially position the inner hub 60 relative to the ring member 32. A circular flange 124 is provided at the center of the front spring retainer plate 88. If desired a conical spring washer 126 can be retained by the circular flange 124 between the inner hub 60 and the front spring retainer plate 88. The conical spring washer 126 presses against the front spring retainer plate 88 and the inner hub 60 to create a frictional drag which retards rotation of the ring member 32 relative to the inner hub 60. In some clutches it is desirable to frictionally retard relative rotation of parts of a torsional vibration damper to modify the damping characteristics of the damper. In other clutches, the conical spring washer 126 is not used.

A rear spring retainer plate 92 is secured to the flat rear surface 40 of the ring member 32 by the same rivet 90 that secures the front spring retainer plate 88 to the flat front surface 38 of the ring member. Eight rivets 90 are employed to secure the front spring retainer plate 88 and the rear spring retainer plate 92 to the ring member 32. The rear spring retainer plate 92 has twelve radially outer spring apertures 128. The outer spring apertures 128 are surrounded by rearwardly projecting flanges 130. The spring apertures 128 and the flanges 130 form spring retainer pockets. The rearwardly projecting flanges 130 are identical to the forwardly projecting flanges 98 on the front spring retainer plate 88 described above. The portions of the rearwardly projecting flanges 130 at the ends of the radially outer spring apertures 128 provide spring drive surfaces 132 and 134. The portions of the rearwardly projecting flange 130 at the sides of the radially outer spring apertures 128 provide curved spring retainer lips 136 and 138. The rear spring retainer plate 92 also has eight radially inner spring apertures 140. The inner spring apertures 140 are surrounded by a rearwardly projecting flange 142. The spring apertures 140 and the flanges 142 form spring retainer pockets. The portions of the rearwardly projecting flange 142 at the ends of the inner spring apertures 140 provide spring drive surfaces 144 and 146. The spring drive surface 146 opposite the spring drive surface 144 is identical to the spring drive surface 114 on the front spring retainer plate 88. The portions of the rearwardly projecting flange 142 at the sides of the inner spring apertures 140 provide curved spring retainer lips 148 and 150. Portions 152 of the rear spring retainer plate 92 between the radially inner spring apertures 140 are offset to the front to axially position the inner hub 60 relative to the ring member 32. With the exceptions of the rearwardly projecting flanges 130 of the outer spring apertures 128, the rearwardly projecting flanges 142 of the inner spring apertures 140, and the portions 152 between the radially inner spring apertures 140, the rear spring retainer plate 92 is a flat disk with a circular outer edge 154 and a circular inner opening with a circular inner edge 156.

The radially outer spring apertures 96 in the front spring retainer plate 88 are substantially identical to the radially outer spring apertures 128 on the rear spring retainer plate 92. The radially inner spring apertures 108 in the front spring retainer plate 88 are substantially identical to the radially inner spring apertures 140 on the rear spring retainer plate 92. The curved spring retainer lips of the flanges surrounding the spring apertures in the front and rear spring retainer plates 88 and 92 retain the spring assemblies 84 and 86 between the spring retainer plates.

The diameter of the inner spring assemblies 86 determines the axial space required between the front spring retainer plate 88 and the rear spring retainer plate 92 in the area of the radially inner spring apertures 108 and 140. The axial thickness of the ring member depends upon the space between the front and rear spring retainer plates 88 and 92 in the area of the radially inner spring apertures 108 and 140. The outer spring assemblies 84 are smaller in diameter than the inner spring assemblies 86. The axial space between the front spring retainer plate 88 and the rear spring retainer plate 92 in the area of the radially outer spring apertures 96 and 128 is determined by the diameter of the outer spring assemblies 84. The circular axial offset 120 in the front spring retainer plate 88 is provided to accommodate the difference between the diameter of the outer spring assemblies 84 and inner spring assemblies 86. The axial thickness of the inner hub 60 is determined by the maximum torque load on the torsional vibration damper 10. The axial thickness of the outer hub 12 is also determined by the maximum torque load on the torsional vibration damper 10. Because the outer hub 12 is larger in diameter and, therefore, has more material, the outer hub does not have to be as thick axially as the inner hub 60 to carry the same total torque. The outer hub 12 and the inner hub 60 are axially positioned by the front spring retainer plate 88 and the rear spring retainer plate 92 so that the inner hub contacts the center of the inner spring assemblies 86 and the outer hub contacts the center of the outer spring assemblies 84. The spring driving ends 18 and 20 of the spring assembly apertures 16 in the outer hub 12, contact the center of the outer spring assemblies 84 to reduce bending loads on the outer spring assemblies. The spring driving ends 72 and 74 of the spring assembly apertures 70 in the inner hub 60 contact the center of the inner spring assemblies 86 to reduce bending loads on the inner spring assemblies.

The outer spring assemblies 84 form an outer stage with twelve spring assemblies that are compressed together in parallel to each other. Compression of the outer spring assemblies 84 correlates to rotation between the outer hub 12 and the ring member 32. As shown in the drawing the outer hub 12 can rotate about twelve degrees in one direction or 12 degrees in the other direction relative to the ring member 32. The inner spring assemblies 86 form an inner stage with eight spring assemblies that are compressed together in parallel to each other. Compression of the inner spring assemblies 86 correlates to rotation between the ring member 32 and the inner hub 60. The ring member 32 can rotate about twelve degrees in one direction or twelve degrees in the other direction relative to the inner hub 60. The inner spring assemblies 86 are compressed in series with the outer spring assemblies 84. The total rotation between the outer hub 12 and the inner hub 60 is about twenty four degrees in each direction. The two-stage torsional vibration damper 10 therefore has about twenty-four degrees double amplitude. The amount of rotation of the outer hub 12 relative to the inner hub 60 that is allowed depends upon a number of factors. These factors include the spring design, the design of the torque transmission tangs 22 and 62, the arcuate grooves 42 and the recesses 52 that limit rotation between the ring member 32 and the outer hub 12 and the inner hub 60. By changing the factors which limit relative rotation between the outer hub 12 and the inner hub 60, the degrees of rotation allowed can be increased or decreased. It is also possible to provide more degrees of rotation in one direction than the other.

The torsional vibration damper 10 is shown, in FIG. 2, mounted in a lock-up clutch for a torque converter. The torque converter, a portion of which is shown, includes an axially movable piston 158 with a friction surface 160, drive lugs 162, and a central mounting flange 164. The mounting flange 164 supports the axially movable piston 158 on the hub barrel 78. A seal 166 prevents oil from passing between the hub barrel 78 and the central mounting flange 164. Hydraulic pressure produced by the torque converter moves the axially movable piston plate 158 forward and away from the torsional vibration damper 10 a short distance and the friction surface 160 engages a friction surface in the torque converter housing, which is not shown. The engine output torque then passes through the axially movable piston plate 158 and slippage in the torque converter is stopped. The drive lugs 162, which project into the slots 14 in the outer hub 12, drive the outer hub 12 and transfer torsional vibrations and torque from an engine to the outer hub 12 until hydraulic pressure is reduced and the axially movable piston plate 158 moves to the rear. When the axially movable piston plate 158 moves to the rear, the friction surface 160 moves out of contact with the torque converter housing and the axially movable piston plate can rotate relative to the torque converter housing.

A control system for the torque converter, in which the torsional vibration damper 10 is mounted, controls the hydraulic pressure exerted on the moveable piston plate 158. Torque converter control systems are well known in the art.

A circular flange 163 on the hub barrel 78 has several apertures 161. The apertures 161 are for rivets or other fasteners that attach a torque converter turbine shell to the hub barrel 78. When the moveable piston plate 158 is not in the lock-up position, the torque converter transfers torque to turbine blades attached to the turbine shell and the turbine shell transfers torque to the hub barrel 78.

The torsional vibration damper 10 can be modified for use as a portion of a manual clutch disk for driving a transmission by extending the outer edge of the outer hub 12 and placing friction material on both sides of the extended portion. The friction material would be clamped between the flat surface of a driven plate or fly wheel and a pressure plate, as is well known in the art.

Figure 7:
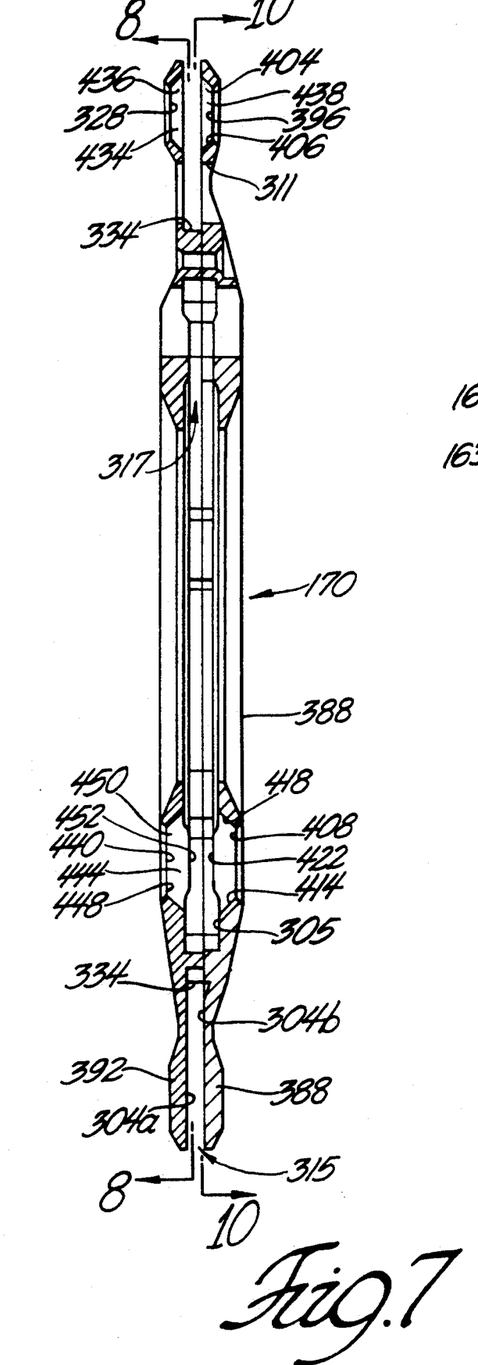
FIG. 7 is a cross sectional view of the spring retainer plates and integral ring member taken along line 7—7 in FIG. 6.
Figure 8:
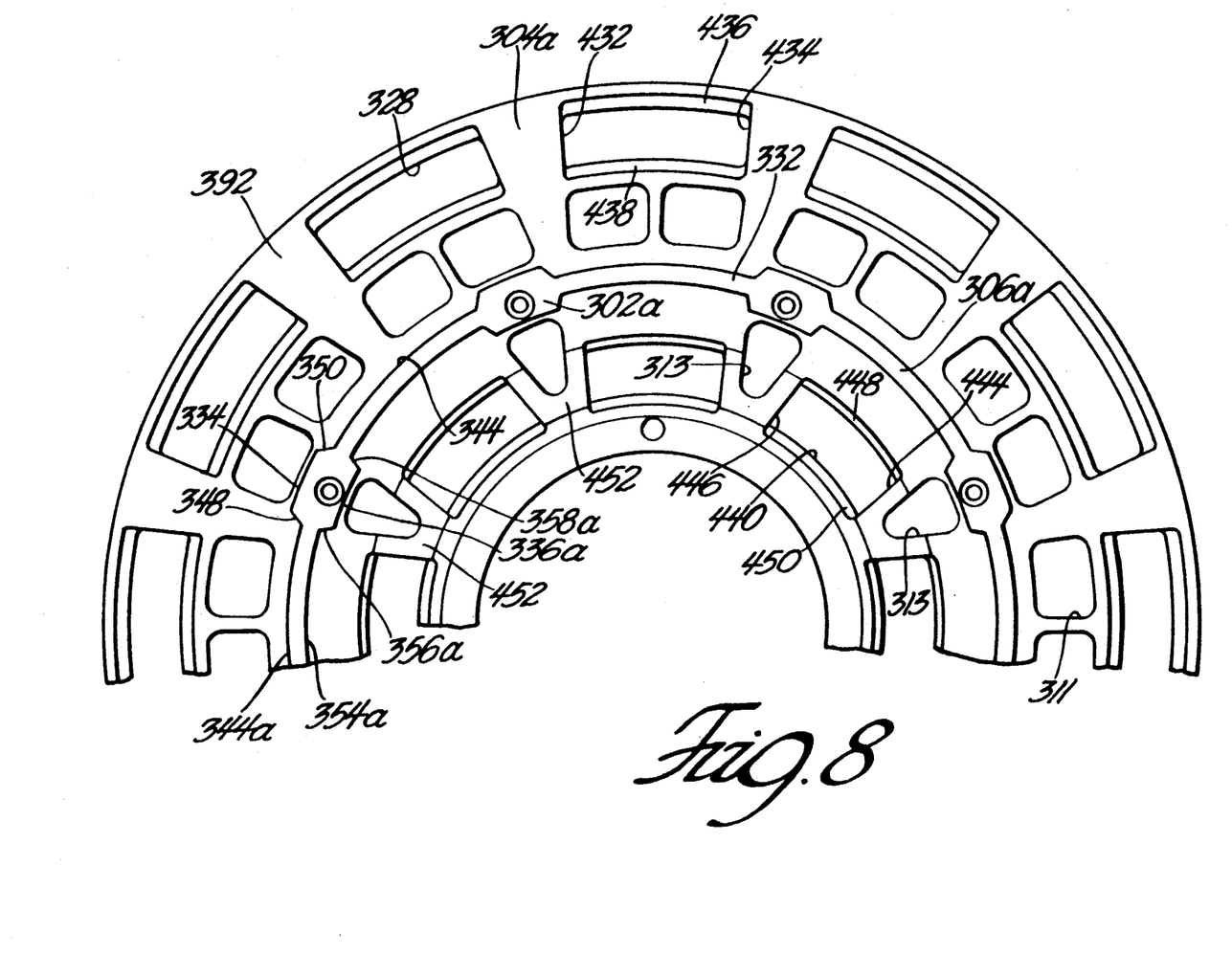
FIG. 8 is a partial front elevational view of the rear spring retainer plate and stop projections.
Figure 9:
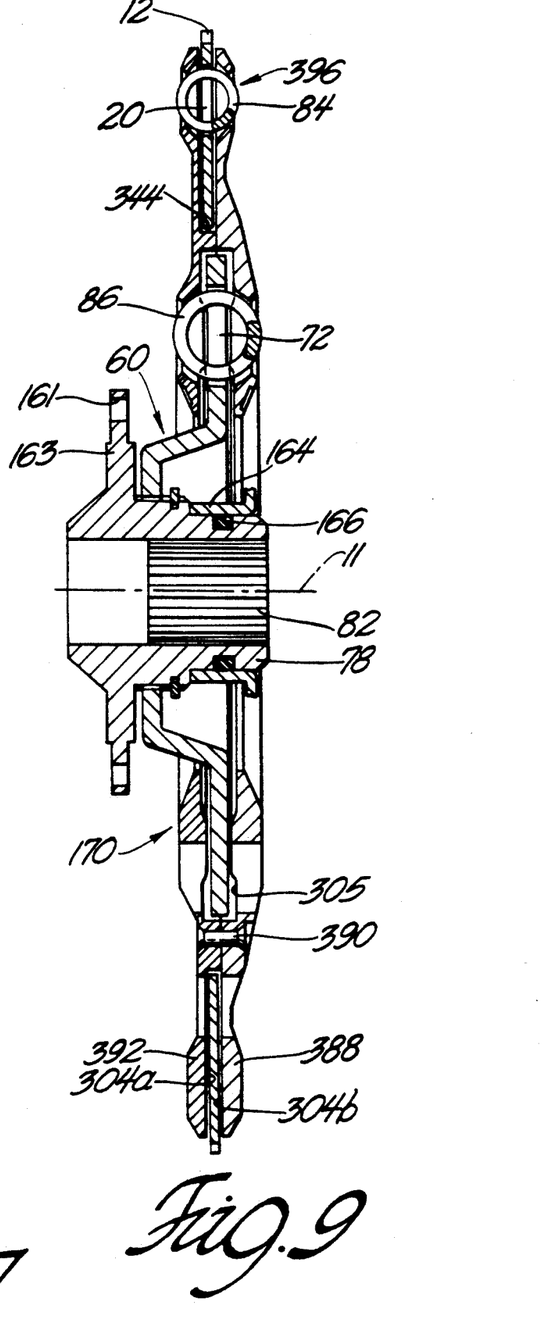
FIG. 9 is a cross-sectional view, similar to FIG. 7, with the inner hub and the outer hub added.

The front spring retainer plate 88, the rear spring retainer plate 92 and the ring member 32 are combined into two parts to form a combined spring retainer and stop assembly 170 in the preferred embodiment of the invention shown in FIGS. 6, 7, 8, 9, and 10. The combined spring retainer and stop assembly 170 includes a front spring retainer plate 388 and a rear spring retainer plate 392 that are cast and riveted together with rivets 390, as shown in FIGS. 7 and 9. The inside surface of the rear spring retainer plate 392, as shown in FIG. 8, has stop projections 302a that project axially from outer flat surface 304a. Arcuate ribs 306a are connected to the stop projections 302a and extend axially from the outer flat surface 304a. The stop projections 302a and arcuate ribs 306a form the rear half of the ring member 332. The front half of the ring member 332 is provided by stop projections 302b and arcuate ribs 306b that extend axially from the inner rear surface 305b of the front spring retainer plate 388. The axial end surfaces of the stop projections 302b and the ribs 306b are in the same plane as the outer flat surface 304b, shown in FIG. 10. The arcuate ribs 30 and the stop projections 302 could be formed entirely on the front spring retainer plate 388, if desired. The stop projections 302a have end surfaces 356a and 358a which can contact stop engaging surfaces 66 and 68 on the torque transmission tangs 62 of the inner hub 60. The stop projections 302a also have arcuate inner surface segments 336a.

The stop projections 302a have radially outer arcuate surfaces 334 and stop end walls 348 and 350. The stop end walls 348 and 350 can contact stop engaging surfaces 26 and 28 on the torque transmission tangs 22 of the outer hub 12 to limit rotation of the outer hub 12 relative to the combined spring retainer and stop assembly 170.

Arcuate rib members 306a connect to adjacent stop projections 302a. Each arcuate rib member 306a has an inner arcuate surface 354a and an outer arcuate surface 344a.

Figure 10:
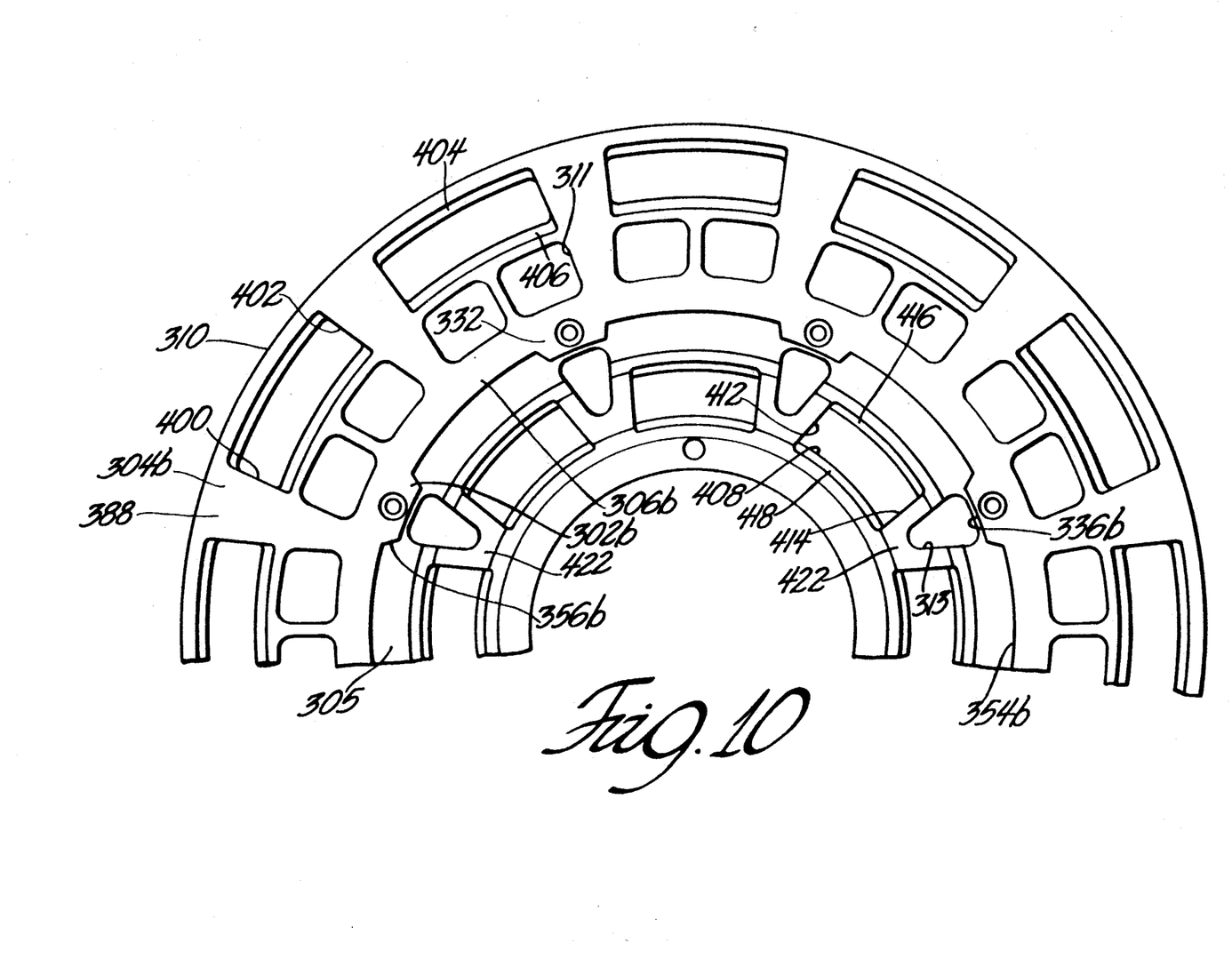
FIG. 10 is a partial rear elevational view of the front spring retainer plate and stop projections.

The front spring retainer plate 388 has stop projections 302b, shown in FIG. 10. The stop projections 302b have end surfaces 356b and 358b which can contact stop engaging surfaces 66 and 68 on the torque transmission tangs 62 of the inner hub 60. The stop projections 302b do not have stop end walls that can limit rotation of the outer hub 12. The arcuate rib members 306b on the front spring retainer plate 388 have an inner arcuate surfaces 354b that extend between adjacent stop projections 302b. The outer arcuate surface of the arcuate rib members 306b is the circular outer edge 310 of the front spring retainer plate 388.

The front and rear spring retainer plates 388 and 392, shown in FIGS. 6 through 10, have generally rectangular apertures 311 and generally triangular apertures 313. The apertures 311 and 313 are provided to reduce weight.

The front spring retainer plate 388 has twelve radially outer spring apertures 396 that define spring drive surfaces 400 and 402 and curved spring retainer lips 404 and 406. The rear spring retainer plate 392 has twelve radially outer spring apertures 328 that define spring driving surfaces 432 and 434 and curved spring retainer lips 43 and 438. When the front and rear spring retainer plates 388 and 392 are secured to each other, as shown in FIGS. 7 and 9, they form twelve radially outer spring pockets for outer spring assemblies 84 and perform the same functions as the front spring retainer plate 88 and the rear spring retainer plate 92.

The front spring retainer plate 388 has radially inner spring apertures 408 that define spring drive surfaces 412 and 414 and curved spring retainer lips 416 and 418. The rear spring retainer plate 392 has eight radially inner spring apertures 440 that define spring drive surfaces 444 and 446 and curved spring retainer lips 448 and 450. When the front and rear spring retainer plates 388 and 392 are secured to each other by rivets 390, as shown in FIGS. 7 and 9, they form eight radially inner spring pockets for inner spring assemblies 86 and perform the same functions as front spring retainer plate 88 and the rear spring retainer plate 92.

The combined spring retainer and stop assembly 170, as shown in FIG. 7, has an outer circular groove 315 defined by the outer flat surface 304a of the rear spring retainer plate 392, the outer flat surface 304b of the front spring retainer plate and the outer arcuate surface 334 on the stop projections 302a of the rear spring retainer plate 392. The combined spring retainer and stop assembly 170 also has an inner circular groove 317. The inner circular groove 317 is defined by flat surface portions 422 between the radially inner spring apertures 408 in the front spring retainer plate 388, flat surface portions 452 between the radially inner spring apertures 440 in the rear spring retainer plate 392, the arcuate surface segments 336a and 336b on the stop projections 302a and 302b and by the inner arcuate surfaces 354a and 354b on the arcuate rib members 306a and 306b.

The outer hub 12 is rotatably supported in the outer circular groove 315. The outer hub 12 is axially positioned between the outer flat surfaces 304a and 304b. The outer hub 12 can be radially positioned by contact between the outer surface segments 334, of the stop projections 302a on the rear spring retainer plate 392, and the inner surface 24 On the outer hub 12. The outer hub 12 can also be radially positioned by contact between the inner tips 30 of the torque transmission tangs 22 on the outer hub 12 and the surface segments 344 of the arcuate ribs 306a on the rear spring retainer plate 392. The outer hub 12 is rotatably supported by one or the other or by both sets of contact surfaces that radially position the outer hub as described above.

The inner hub 60 is rotatably supported in the inner circular groove 317. The inner hub 60 is axially positioned between the flat surface portions 422 and the flat surface portions 452 that are between the inner spring apertures 408 and 440. Contact between the inner surface segments 336a and 336b of the stop projections 302a and 302b and the arcuate edge surface 64 of the inner hub 60 can radially position the inner hub 60 as well as contact between the outer surface 67 of the torque transmission tangs 62 and the arcuate surfaces 354a and 354b of the arcuate ribs 306a and 306b. The inner hub 60 is rotatably supported by one or the other or by both sets of contact surfaces that radially position the inner hub as described above.

During operation of the torsional vibration damper 10, the outer hub 12 is driven by a power source such as an internal combustion engine. Spring driving ends 18 or 20 of the spring assembly apertures 16 drive one end or the other of each of the outer spring assemblies 84. The end of each of the outer spring assemblies 84, which is driven by the outer hub 12, depends upon the direction the outer hub is rotated. The outer spring assemblies 84 drive the front spring retainer plate 88 or 388 and the rear spring retainer plate 92 or 392. When the drive torque is relatively low, the ring member 32 or the stop projections 302a and 302b and the rivets 90 or 390 transmit little or no torque. The front spring retainer plate 88 or 388 and the rear spring retainer plate 92 or 392 drive the radially inner spring assemblies 86. The radially inner spring assemblies 86 contact the spring driving ends 72 or 74 of the spring assembly apertures 70 to drive the inner hub 60. The inner hub 60 drives the hub barrel 78 which drives, either directly or indirectly, a transmission input shaft.

During low torque transmission, the torque transmission tangs 22 are in the center portions of the arcuate grooves 42 in the ring member 32 or midway between the stop projections 302a and the torque transmission tangs 62 are in the center portions of the recesses 52 in the ring member or midway between the stop projections 302a and 302b. During low torque transmission, the ring member 32 or the stop projections 302a and 302b do not transmit torque.

The radially inner spring assemblies 86 will be assumed to be stiffer than the radially outer spring assemblies 84 for convenience and ease of explanation. In practice, the outer spring assemblies 84 could be the stiffest, if desired. As the torque transmitted through the torsional vibration damper 10 increases, the radially outer spring assemblies 84 are compressed together in parallel until the stop engaging surfaces 26 or 28 contact the end walls 48 or 50 of the arcuate grooves 42 in the ring member 32 or contact the end walls 348 or 350 and rotation of the ring member or the combined spring retainer and stop assembly 170 relative to the outer hub 12 stops. Relative rotation between the outer hub 12 and the ring member 32 or the combined spring retainer and stop assembly 170 is stopped before the outer spring assemblies 84 are fully compressed. The outer spring assemblies 84 continue to transmit their maximum allowable torque after the stop engaging surfaces 26 or 28 on the torque transmission tangs 22 contact the end walls 48 or 50 of the ring member 32 or the end walls 348 or 350 of the stop projections 302a. Further torque increases are transmitted through the torque transmission tangs 22 to the ring member 32 or to the stop projection 302a, through the rivets 90 or 390 and to the front spring retainer plate 88 or 388 and to the rear spring retainer plate 92 or 392 and then to the inner spring assemblies 86. The inner spring assemblies 86 transmit torque to the inner hub 60.

Further increases in the torque transmitted by the torsional vibration damper 10 compresses the inner spring assemblies 86. Compression of inner spring assemblies 86 occurs together in parallel. The inner spring assemblies 86 are compressed, with increasing torque until the end walls 48 o 50 of the arcuate grooves 42 of the ring member 32 or the end walls 348 or 350 of the stop projection 302a and 302b contact the stop engaging surfaces 66 or 68 of the torque transmission tangs 62 and rotation of the ring member 32 or the combined spring retainer and stop assembly 170 relative to the inner hub 60 is stopped. The stop engaging surfaces 66 or 68 of the torque transmission tangs 62 are contacted by the end walls 48 or 50 on the ring member 32 or the end walls 348a and 350b on the combined spring retainer and stop assembly 170 before the inner spring assemblies 86 are completely compressed and become solid. Any further increases in the torque transmitted by the torsional vibration damper 10 is transmitted from the outer hub 12 to the ring member 32 to the inner hub 60 or from the outer hub 12, to the stop projections 302a and 302b, to the inner hub 60.

The maximum torque transmitted by the front spring retainer plate 88 and the rear spring retainer plate 92 is the maximum torque transmitted by the outer spring assemblies 84 and the inner spring assemblies 86. The maximum torque transmitted by the front and rear spring retainer plates 388 and 392 is the same as the torque transmitted by the spring retainer plate 88 and 92 except for the torque transferred through the stop projections 302a and 302b. When the torque transmitted by the torsional vibration damper exceeds the torque transmitted by all the spring assemblies, the front spring retainer plate 88 and the rear spring retainer plate 92 continue to transmit their maximum torque. The maximum torque transmitted by the rivets 90 or 390 is the difference between the torque transmitted by the stiffest series of spring assemblies 84 or 86 and the torque transmitted by the softest series of spring assemblies.

The torsional vibration damper 10 has been described above assuming that the outer spring assemblies 84 are compressed in parallel and that the inner spring assemblies are also compressed in parallel. The outer spring assemblies 84 or the inner spring assemblies 86 could each include springs that are in a series relationship. If desired the outer spring assemblies 86 and the inner spring assemblies could include springs that are in a series relationship.

The torsional vibration damper 10 dampens torsional vibrations when the torque transmitted is less than the torque required to fully compress the outer spring assemblies 84 and the inner spring assemblies 86. After both the outer spring assemblies 84 and the inner spring assemblies 86 are fully compressed, torsional vibrations are transmitted from the outer hub 12 to the ring member 32 or the stop projections 302a and 302b, to the inner hub 60, to the hub barrel 78 and to a transmission input shaft.

The torsional vibration damper 10 can dampen torsional vibrations in either direction. Torsional vibrations are dampened when an internal combustion engine is driving as well as when an internal combustion engine is slowing or breaking the vehicle or other machine driven by the engine. Torsional vibrations induced by a driven machine or component can be dampened as well as torsional vibrations from the driving engine.

The torsional vibration damper has been described in detail in connection with the preferred embodiment. The preferred embodiment is, however, an example only and invention is not restricted thereto. Those skilled in the art will understand that variations and modifications can be made within the scope of the invention.

We claim:

1. A torsional vibration damper for transmitting torque between driving members and driven members including an inner hub with a central torque output member, a plurality of spring assembly apertures and an outer edge surface; a ring member rotatably supported on the inner hub adjacent to the outer edge of the inner hub; an outer hub having a central aperture which receives the ring member and rotatably supports the outer hub on the ring member, a plurality of spring assembly apertures in the outer hub, and at least one torque input member integral with the outer hub; spring assemblies in the spring assembly apertures in the inner hub; spring assemblies in the spring assembly apertures in the outer hub; and at least one spring retainer plate attached to the ring member and rotatably supported by the ring member adjacent to the inner hub and the outer hub and operable to transmit torque between the spring assemblies in the outer hub spring assembly apertures and the spring assemblies in the inner hub spring assembly apertures.

2. A torsional vibration damper as set forth in claim 1, including means operable to limit rotation between the outer hub and the ring member and to limit rotation between the ring member and the inner hub.

3. A torsional vibration damper as set forth in claim 1, including a stop system having grooves with end walls in the ring member and torque transmission tangs on the outer hub that project into the grooves and are operable to engage the end walls of the grooves in the ring member to limit rotation of the outer hub relative to the ring member.

4. A torsional vibration damper as set forth in claim 3, wherein the stop system has recesses with recess end surfaces in the ring member and torque transmission tangs on the inner hub that project into the recesses in the ring member and are operable to engage the recess end surfaces in the ring member to limit rotation of the ring member relative to the inner hub.

5. A torsional vibration damper as set forth in claim 4, wherein the inner hub has front and rear axially spaced apart surfaces and the outer hub has front and rear axially spaced apart surfaces, and further including a first spring retainer plate attached to the ring member and positioned adjacent to said front surface of the inner hub and said front surface of the outer hub; and a second spring retainer plate attached to the ring member and positioned adjacent to said rear surface of the inner hub and said rear surface of the outer hub.

6. A torsional vibration damper as set forth in claim 1, including a stop system having recesses with recess end surfaces in the ring member and torque transmission tangs on the inner hub that project into the recesses in the ring member and are operable to engage the recess end surfaces in the ring member to limit rotation of the ring member relative to the inner hub.

7. A torsional vibration damper as set forth in claim 1, wherein the inner hub has front and rear axially spaced apart surfaces and the outer hub has front and rear axially spaced apart surfaces, and further including a first spring retainer plate attached to the ring member and positioned adjacent to said front surface of the inner hub and said front surface of the outer hub; and a second spring retainer plate attached to the ring member and positioned adjacent to said rear surface of the inner hub and said rear surface of the outer hub.

8. A torsional vibration damper for transmitting torque between driving and driven members including an inner hub with a central output member, a plurality of spring assembly apertures and an outer edge surface; a ring member rotatably supported by the inner hub; an outer hub rotatably supported by the ring member and having a central aperture, a plurality of spring assembly apertures and torque input members; spring assemblies in the spring assembly apertures in the inner hub; spring assemblies in the spring assembly apertures in the outer hub; at least one spring retainer plate rotatably supported adjacent to the inner hub and the outer hub and operable to transmit torque between the spring assemblies in the outer hub and the spring assemblies in the inner hub; first stop member including surfaces on the ring member that cooperate with surfaces on the outer hub that are operable to limit rotation between the outer hub and the ring member; and second stop members including additional surfaces on the ring member that cooperate with surfaces on the inner hub that are operable to limit rotation between the ring member and the inner hub.

9. A torsional vibration damper as set forth in claim 8, wherein the inner hub has front and rear axially spaced apart sides and the outer hub has front and rear axially spaced apart sides, and further including a first spring retainer plate attached to the ring member and positioned adjacent to said front side of the inner hub and said front side of the outer hub; and a second spring retainer plate attached to the ring member and positioned adjacent to said rear side of the inner hub and said rear side of the outer hub.

10. A torsional vibration damper as set forth in claim 8, wherein said first stop members operable to limit rotation between the outer hub and the ring member include arcuate grooves with end walls in the ring member and torque transmission tangs on the outer hub that project into the arcuate grooves and are operable to engage the end walls of the arcuate grooves in the ring member to limit rotation of the outer hub relative to the ring member.

11. A torsional vibration damper as set forth in claim 10, wherein said second stop members operable to limit rotation between the ring member and the inner hub include recesses with recess end surfaces in the ring member and torque transmission tangs on the inner hub that project into the recesses in the ring member and are operable to engage the recess end surfaces in the ring member to limit rotation of the ring member relative to the inner hub.

12. A torsional vibration damper as set forth in claim 8, wherein said second stop members operable to limit rotation between the ring member and the inner hub include recesses with recess end surfaces in the ring member and torque transmission tangs on the inner hub that project into the recesses in the ring member and are operable to engage the recess end surfaces in the ring member to limit rotation of the ring member relative to the inner hub.

13. A torsional vibration damper for transmitting torque between driving and driven members, including an outer hub with a torque input drive member, spring assembly apertures, a central bore and torque transmission tangs with stop engaging surfaces; a ring member positioned in the central bore of the outer hub and having radially outer grooves that receive the torque transmission tangs of the outer hub, end walls at the ends of the grooves operable to contact the stop engaging surfaces on the outer hub torque transmission tangs to limit rotation of the outer hub relative to the ring member, radially inner recesses with recess end surfaces and a central bore; an inner hub positioned in the central bore of the ring member and having torque transmission tangs that project into the radially inner recesses in the ring member and with stop engaging surfaces on the inner hub torque transmission tangs that are operable to contact the recess end surfaces of the radially inner recesses in the ring member to limit rotation of the ring member relative to the inner hub, spring assembly apertures in the inner hub and a central torque output member; compression spring assemblies in the spring assembly apertures in the outer hub; compression spring assemblies in the spring assembly apertures in the inner hub; a front spring retainer plate secured to the ring member and having spring retainer pockets for retaining compression spring assemblies in the spring assembly apertures in the outer hub, spring drive surfaces at the ends of the spring retainer pockets for transmitting torque between the compression spring assemblies and the front spring retainer plate, spring retainer pockets for retaining compression spring assemblies in the spring assembly aperture int he inner hub, spring drive surfaces at the ends of the spring retainer pockets for transmitting torque between the compression spring assemblies and the front spring retainer plate; a rear spring retainer plate secured to the ring member and having spring retainer pockets for retaining compression spring assemblies in the spring assembly apertures in the outer hub, spring drive surfaces at the ends of the spring retainer pockets for transmitting torque between the compression spring assemblies and the rear spring retainer plate, spring retainer pockets for retaining compression spring assemblies in the spring assembly apertures in the inner hub, spring drive surfaces at the ends of the spring retainer pockets for transmitting torque between the compression spring assemblies and the rear spring retainer plate; and a torque output member at the center of the inner hub.

14. A torsional vibration damper as set forth in claim 13, wherein a portion of the outer hub is between the front spring retainer plate and the rear spring retainer plate, and wherein a portion of the inner hub is between the front spring retainer plate and the rear spring retainer plate.

15. A torsional vibration damper as set forth in claim 13, wherein the stop engaging surfaces of the torque transmission tangs on the outer hub contact said end walls of the outer grooves of the ring member to prevent over compression of the compression spring assemblies in the spring assembly apertures in the outer hub.

16. A torsional vibration damper as set forth in claim 13, wherein the recess end surfaces of inner recesses in the ring member contact said stop engaging surfaces on the inner hub torque transmission tangs to prevent over compression of the compression spring assemblies in the spring assembly apertures in the inner hub.

17. A torsional vibration damper as set forth in claim 13, including a conical spring washer in contact with the inner hub and one of the spring retainer plates to retard rotation of the spring retainer plates relative to the inner hub.

18. A torsional vibration damper for transmitting torque between driving and driven members including a spring retainer and stop assembly with a radially outer groove, a radially inner groove, a ring member separating the outer groove from the inner groove, a plurality of outer spring retainer pockets, and a plurality of inner spring retainer pockets; an outer hub with a torque input drive member, and spring assembly apertures, rotatably supported in the radially outer groove on the ring member in the spring retainer and stop assembly; an inner hub, having spring assembly apertures and a central torque output member, rotatably supported in the radially inner groove by the ring member in the spring retainer and stop assembly; an outer spring assembly mounted in each outer hub spring assembly aperture and each outer spring retainer pocket in the spring retainer and stop assembly, operable to transmit torque between the outer hub and the spring retainer and stop assembly; and an inner spring assembly mounted in the inner hub spring assembly aperture and each inner spring retainer pocket in the spring retainer and stop assembly, operable to transmit torque between the spring retainer and stop assembly and the inner hub.

19. A torsional vibration damper as set forth in claim 18 including stop means to limit rotation between the outer hub and the spring retainer and stop assembly and stop means to limit rotation between the inner hub and the spring retainer and stop assembly.

20. A torsional vibration damper as set forth in claim 18 including a plurality of stop projections in the spring retainer and stop assembly; a plurality of torque transmission tangs on the outer hub operable to engage the stop projections to limit rotation of the outer hub relative to the spring retainer and stop assembly; and a plurality of torque transmission tangs on the inner hub operable to be engaged by the stop projections to limit rotation of the spring retainer and stop assembly relative to the inner hub.

* * * * *